(12) United States Patent
Kaemmerer et al.

(10) Patent No.: US 9,736,034 B2
(45) Date of Patent: Aug. 15, 2017

(54) SYSTEM AND METHOD FOR SMALL BATCHING PROCESSING OF USAGE REQUESTS

(71) Applicant: ORACLE INTERNATIONAL CORPORATION, Redwood Shores, CA (US)

(72) Inventors: Jens Kaemmerer, Mountain View, CA (US); Ashish Srivastava, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 496 days.

(21) Appl. No.: 13/622,546

(22) Filed: Sep. 19, 2012

(65) Prior Publication Data
US 2014/0082170 A1    Mar. 20, 2014

(51) Int. Cl.
G06F 15/173 (2006.01)
H04L 12/24 (2006.01)
H04L 29/08 (2006.01)
H04M 15/00 (2006.01)

(52) U.S. Cl.
CPC ...... *H04L 41/5029* (2013.01); *H04L 67/1002* (2013.01); *H04L 67/2833* (2013.01); *H04M 15/64* (2013.01); *H04M 15/70* (2013.01); *H04M 15/725* (2013.01)

(58) Field of Classification Search
None
See application file for complete search history.

(56) References Cited

U.S. PATENT DOCUMENTS

| | | | |
|---|---|---|---|
| 6,760,417 B1 | 7/2004 | Wallenius | |
| 7,136,913 B2 | 11/2006 | Linderman | |
| 7,483,438 B2 | 1/2009 | Serghi et al. | |
| 7,908,358 B1 * | 3/2011 | Prasad et al. | 709/224 |
| 8,296,409 B2 | 10/2012 | Banerjee et al. | |
| 2002/0025795 A1 | 2/2002 | Sharon et al. | |

(Continued)

OTHER PUBLICATIONS

European Patent Office, International Searching Authority, International Search Report and Written Opinion dated Apr. 17, 2014 for International Application No. PCT/US2013/060591, 8 pages.

(Continued)

*Primary Examiner* — Kyung H Shin
(74) *Attorney, Agent, or Firm* — Tucker Ellis LLP (57) ABSTRACT

In accordance with various embodiments, systems and methods that provide unified charging across different network interfaces are provided. A system for small batch processing of usage requests, can include a service broker, a plurality of servers wherein each server includes customer data, and a plurality of queues, each associated with a different server. When a usage request is received from a network entity, the service broker is configured to determine an internal ID associated with data requested by the usage request, determine on which particular server of the plurality of servers the data requested by the usage request is stored, enqueue the usage request in a particular queue associated with the particular server, and upon a trigger event, send all requests in the particular queue to the particular server in a batch.

20 Claims, 5 Drawing Sheets

(56) References Cited

U.S. PATENT DOCUMENTS

| | | | |
|---|---|---|---|
| 2003/0028790 | A1 | 2/2003 | Bleumer et al. |
| 2004/0009762 | A1 | 1/2004 | Bugiu et al. |
| 2005/0245230 | A1 | 11/2005 | Benco et al. |
| 2005/0288941 | A1* | 12/2005 | DuBois et al. ............... 705/1 |
| 2007/0106801 | A1 | 5/2007 | Jansson |
| 2007/0130367 | A1* | 6/2007 | Kashyap .................. 709/245 |
| 2007/0143470 | A1 | 6/2007 | Sylvain |
| 2008/0103923 | A1 | 5/2008 | Rieck et al. |
| 2008/0155038 | A1* | 6/2008 | Bachmann et al. ........ 709/206 |
| 2009/0268715 | A1 | 10/2009 | Jansson |
| 2010/0312883 | A1* | 12/2010 | Winn et al. ............... 709/224 |
| 2011/0072073 | A1* | 3/2011 | Curtis ...................... 709/203 |
| 2011/0082920 | A1 | 4/2011 | Bhattacharya et al. |
| 2012/0239812 | A1* | 9/2012 | Gargash et al. ........... 709/226 |

OTHER PUBLICATIONS

Bea, WebLogic Network Gatekeeper, Architectural Overview, Version 3.0, 112 pages, Sep. 2007.
Chen et al., Applying SOA and Web 2.0 to Telecom: Legacy and IMS Next-Generation Architectures, IEEE, 6 pages, 2008.
Oracle Communication Services Gatekeeper Concepts and Architectural Overview, Release 4.1, Oracle, 94 pages, Jan. 2009.

\* cited by examiner

SYSTEM AND METHOD FOR SMALL BATCHING PROCESSING OF USAGE REQUESTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to online charging systems in telecommunications networks and in particular to a system and method for batch processing of requests in a telecommunications system.

BACKGROUND

Typically, high volumes of usage requests are sent in a continuous network stream to an Online Charging System (OCS) entry point from an Intelligent Network node (IN). A usage request is any form of usage processing which requires customer data for charging purposes including, for example: a kilowatt of electricity used by a commercial customer during peak hour; a call from one subscriber to another; or a download request. Each usage request is processed separately and a response is returned to the originating IN.

Processing of usage requests is typically accomplished asynchronously: while one usage request is being processed, the next usage request can already be read from the network connection. The chronological order of incoming usage requests and outgoing usage responses can be different as a result of this asynchronous processing. Inside the OCS, processing of an individual usage request is typically accomplished synchronously: the usage request is sent from the OCS entry point to the OCS business logic nodes for processing. One OCS entry point typically serves many OCS business logic nodes.

Sending a small usage request (typically 100-200 bytes in size) results in costly network IO operations, context switches and transmission latency. If the time spent to process the individual usage request is very short (e.g., below 1 ms)—this cost can become a limiting factor for the OCS throughput and increase the Total Cost of Ownership (TCO) of the OCS. The OCS latency requirements for usage request processing is: 99.9% of all usage requests should be processed in less than 50 ms.

SUMMARY

In accordance with various embodiments, systems and methods that provide small batch processing of usage requests are provided. A system for small batch processing of usage requests, can include a service broker, a plurality of servers wherein each server includes customer data, and a plurality of queues, each associated with a different server. When a usage request is received from a network entity, the service broker is configured to determine an internal ID associated with data required for processing the usage request, determine on which particular server of the plurality of servers the data requested by the usage request is stored, enqueue the usage request in a particular queue associated with the particular server, and upon a trigger event, send all requests in the particular queue to the particular server in a batch.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Typically, high volumes of usage requests are sent in a continuous network stream to an Online Charging System (OCS). A usage request is any form of usage processing which requires customer data for charging purposes including, for example: a kilowatt of electricity used by a commercial customer during peak hour; a call from one subscriber to another; or a download request. In accordance with various embodiments, systems and methods that provide small batch processing of usage requests are provided. A system for small batch processing of usage requests, can include a service broker, and a plurality of servers forming the OCS. Each server includes customer data, and a plurality of queues, each associated with a different server. When a usage request is received from a network entity, the service broker is configured to determine an internal ID associated with data required for processing the usage request, determine on which particular server of the plurality of servers the data requested by the usage request is stored, enqueue the usage request in a particular queue associated with the particular server, and upon a trigger event, send all requests in the particular queue to the particular server in a batch.

In accordance with various embodiments of the invention, instead of sending each individual usage request directly from the OCS entry point to the OCS business logic layer, usage requests can first be sorted based on their OCS business logic node destination. Each node of the OCS business logic layer carries out the same business logic. However, customer data is partitioned across all OCS business logic. The OCS business logic node destination is determined based on the location of the customer data.

All usage requests with the same destination are then placed in the same 'small batch' container (i.e., queue). The maximum size of each 'small batch' container can be set to an arbitrary number depending on the particular needs and features of a system. Although examples shown herein use a maximum size of 20, this is not intended to be limiting in any way. The 'small batch' container is sent once the maximum size has been reached. The cost of sending the 'small batch' container in terms of network IO operations, context switches and transmission latency is significantly less on a per usage request basis than the cost of sending each usage request individually.

Overall OCS throughput can be increased in exchange for increasing individual usage request latency. Latency of the individual usage request is now a function of the size of the 'small batch' and increases to 30 ms (assuming 1 ms processing time for an individual usage request). The OCS latency requirement of less than 50 ms is still fulfilled. Additional triggers can also be provided which cause the small batch to be sent. For example, during times of low usage request traffic volumes, a 'small batch' timeout mechanism can trigger sending of an incomplete 'small batch' to guarantee less than 50 ms latencies. Additional triggers can be provided for prioritization of requests. Upon arrival of a specific type of request, the small batch is sent immediately. For example, upon arrival of a long running request (ie. if executing the logic takes >25 ms of processing time) the request can be sent immediately in a small batch all by itself.

Figure 1:
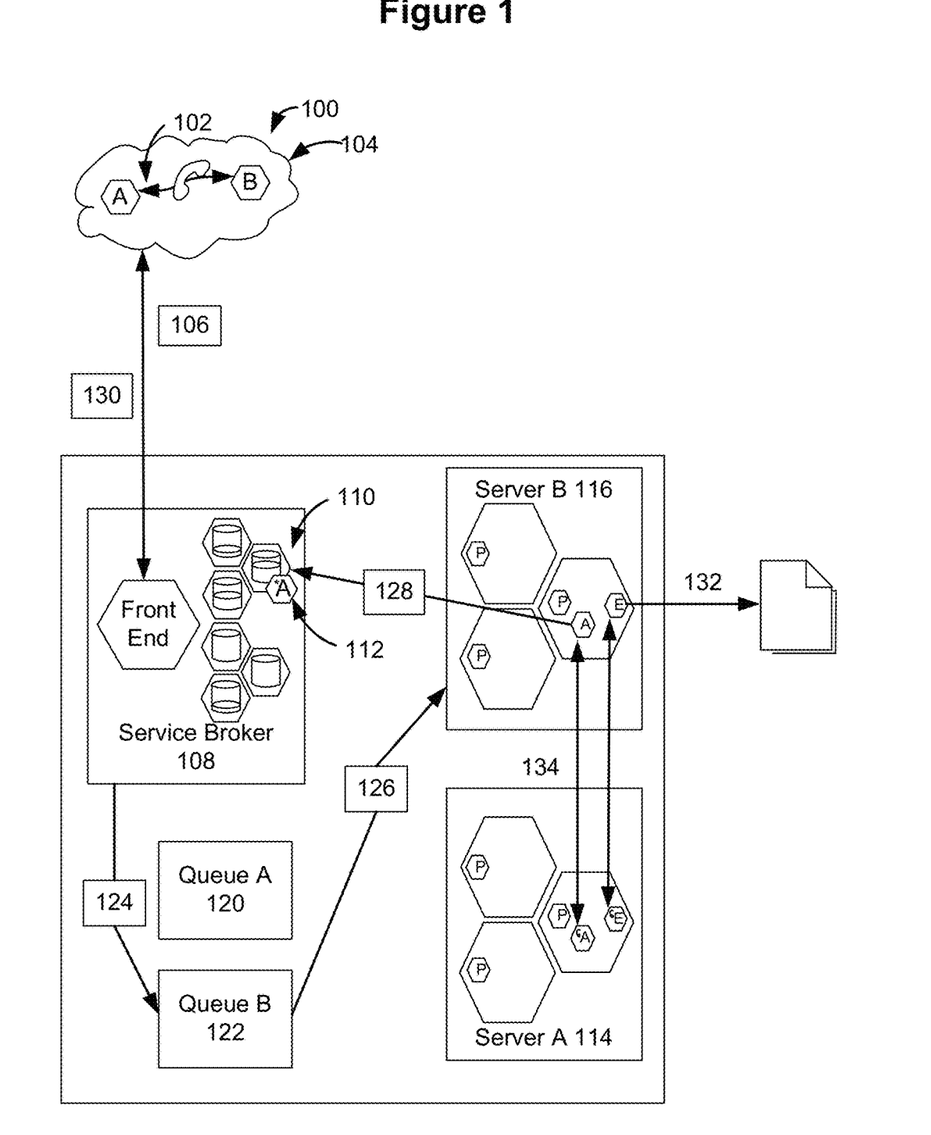
FIG. 1 shows a system for small batch processing of usage requests, in accordance with an embodiment of the invention.

FIG. 1 shows a system for small batch processing of usage requests, in accordance with an embodiment of the invention. At 100, Subscriber A 102 makes a call to subscriber B 104. Although a call is shown in FIG. 1, this can be anything that the system views as an event, e.g., an SMS from A to B, a request by A to download media for which there is a charge, or any other action that results in a usage request. The request 106 is sent to a service broker 108 which can translate the request from a network-centric protocol into an internal native protocol, for example, an internal native protocol of the OCS. The service broker 108 can then analyze the request 106 to determine where the requested data is located. In accordance with an embodiment, the service broker can determine the data location using a cache 110 which stores internal (customer) IDs 112 of data corresponding to external IDs used in the requests.

Data is located on one or more servers, such as server A 114 and server B 116. Customer data is distributed across multiple server machines (first dimension) and across multiple processes (here called 'server') within a single server machine (second dimension). A typical process 'hosts' multiple partitions. Thus, each server can include a plurality of partitions, which each include a plurality of customer objects. Once the process, including the data required to process the request, is located (including identifying on which partition of which server the data is stored), then the request can be put into a queue associated with that process. Each queue is a per-server queue, so in this case there would be two queues, queue A 120 and queue B 122. Traffic that is received for a particular server accumulates in the particular server's associated queue. For example, after the request 106 has been translated, the translated request 124 is placed in queue B 122. Once a trigger event occurs, a batch of requests 126 from queue B are sent to server B 116 for processing.

In accordance with an embodiment of the invention, the server can process the batch of requests 126 sequentially, taking each request in turn and generating a response. When all requests in the batch have been processed by the server the entire batch of responses is sent back 128 to the service broker 108. The service broker 108 then translates the responses from their internal native representations to the network-centric protocol of the requester, and then the translated responses are sent back to the requestor. For example, the service broker 108 can identify the response to translated request 124 and translate the response back from the internal native protocol to the network-centric protocol of the request. The translated response 130 is then returned.

Additionally, as shown in FIG. 1, data from the servers can be synchronously serialized and backed up on another node. In this way the data can be replicated 134 on another node to provide high availability. The data can also be asynchronously persisted 132 in a database. The data which is replicated and/or persisted can include, for example, one or more of the data required to process the request, customer data, and/or event-related data. In the case of node failure, where a server crashes midway through processing a batch, requests included in that batch are quarantined while the backup server comes online. Once the quarantine ends, requests are processed again.

Figure 2A:
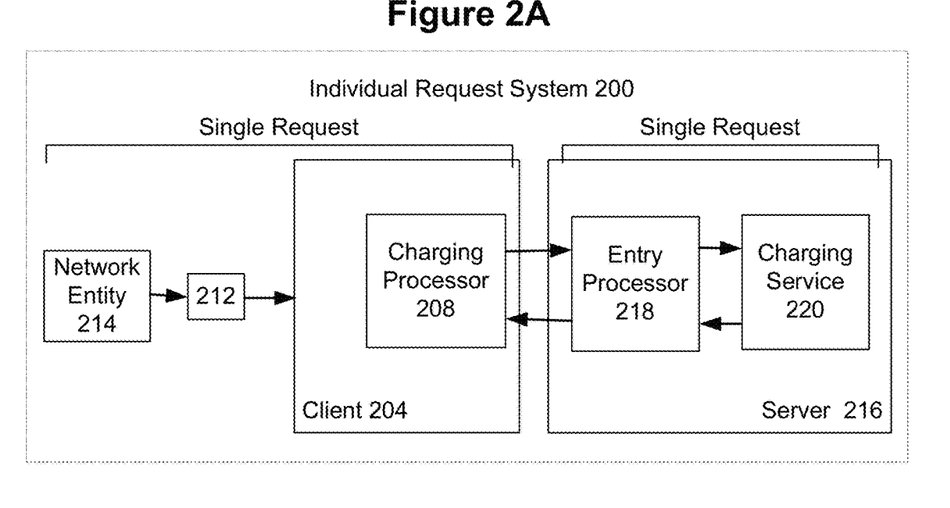
FIGS. 2A and 2B show a comparison of small batch processing and individual request processing, in accordance with an embodiment of the invention.
Figure 2B:
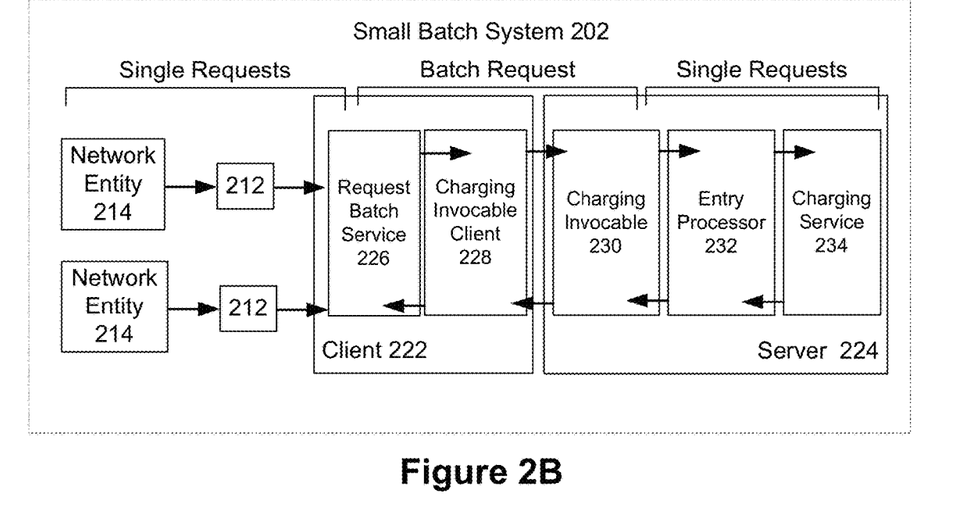

FIGS. 2A and 2B show a comparison of individual request processing and small batch processing, in accordance with an embodiment of the invention. FIGS. 2A and 2B compare a typical individual request system 200 with a small batch request system 202 in accordance with an embodiment of the invention.

As shown in FIG. 2A, the client side 204, for example a service broker (such as a service broker 108), of the individual request system 200 can include a charging processor client 208. When a usage request 212 is received from a network entity 214 (e.g., when a first subscriber calls a second subscriber, or when a subscriber requests to download media), that request 212 is handed off to a separate thread running the charging processor client 208. (Note that there would typically be hundreds of such threads running concurrently in the client 204.) The charging processor can translate the request as necessary before forwarding the request to the server side 216 of the individual request system 200.

On the server side 216, an entry processor 218 receives the request 212 and forwards it on to the appropriate charging service 220. A response is then returned in a similar fashion. The response is returned synchronously. Thus, in the individual request system 200, described above with respect to FIG. 2A, each request is received, processed and sent to the server as it comes in. Prior systems found this arrangement workable because typical transit time is 1 ms, while server processing time is closer to 50 ms. However, improvements in architecture have reduced server processing time to much less than 1 ms, making transit time a substantial factor. By submitting requests in batches, this transit time can be spread over many requests, greatly reducing the amount of time per message spent on transit.

FIG. 2B shows the small batch request system 202. On the client side 222 of the small batch request system 202, requests are similarly received from network entities. However, rather than immediately processing and forwarding these requests to the server side 224, a request batch service 226 aggregates the requests into per-server queues (e.g., queues 120 and 122 as shown in FIG. 1). When a triggering event occurs, such as a timeout or the batch is full, a batch of requests is created from the contents of the queue, and charging invocable client 228 is used to submit the batch of requests to the server side 224. A server side charging invocable module 230 can then process the batch of requests sequentially, forwarding each individual request to an entry processor 232 which can then forward the request to the appropriate charging service 234. When each request in the batch has been processed, the server side charging invocable module 230 can send the batch of requests, now populated with response data, back to the charging invocable client 228 and on to the request batch service 226. The request batch service 226 can then return each response to its requestor.

Figure 3:
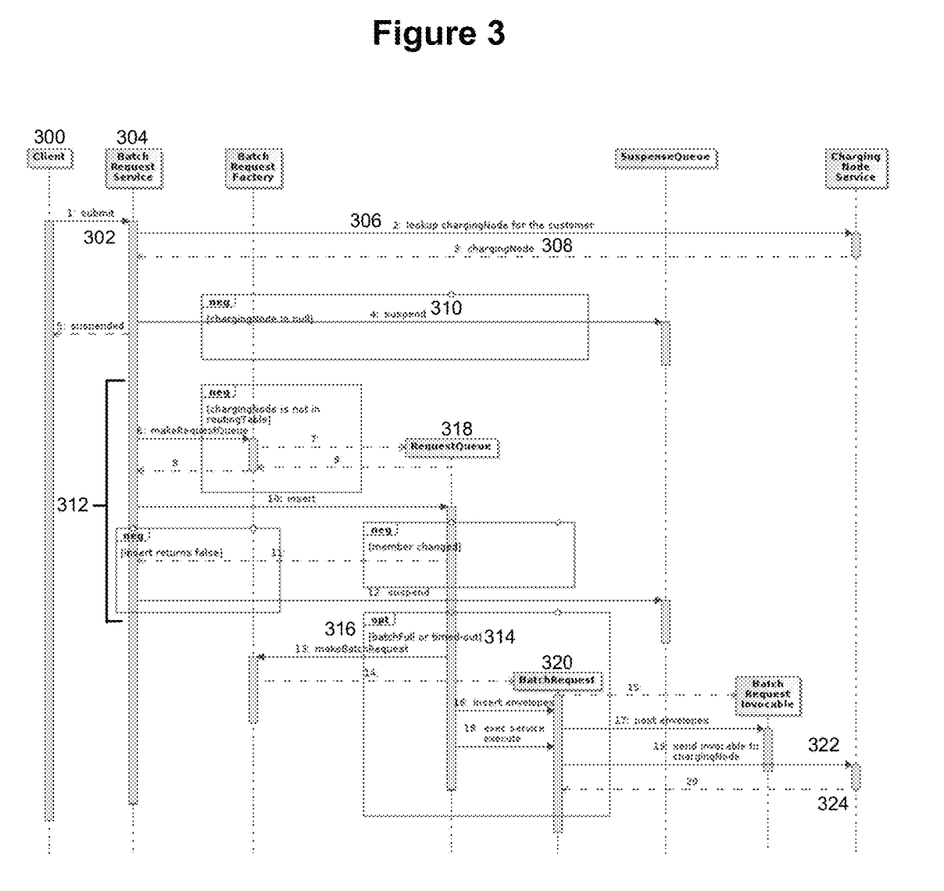
FIG. 3 shows a sequence diagram of small batch creation, in accordance with an embodiment of the invention.

FIG. 3 shows a sequence diagram of small batch creation, in accordance with an embodiment of the invention. As described above, in accordance with an embodiment of the invention, a plurality of different triggers can be used to send a batch of requests from a queue to its associated server. These triggers can include, but are not limited to, a timeperiod, a maximum queue size, or priority information associated with a request. Once the trigger has been satisfied, then a batch request is created out of the contents of the queue which is sent to the associated server.

As shown in FIG. 3, a client 300 (for example a service broker, such as service broker 108) can submit 302 a translated request to a batch request service 304. The batch request service can determine 306 the node on which the data required for processing the usage request is stored and return 308 the name of the node on which the requested data is stored. If the node information returned is invalid e.g. null, for example because the node has crashed, then the system can enter a suspend 310 mode and the requests in its associated queue are quarantined (i.e., taken out of circulation) during the recovery process. Otherwise, as shown at 312, the individual request is inserted into the request queue for the identified node. When a trigger event occurs 314, a batch request 316 is made from the contents of the request queue 318. Once the batch request has been created 320, the batch request is handed off to a 'dedicated thread' which subsequently sends 322 the batch request to the queue's associated server. The 'dedicated thread' is pre-allocated as part of a large thread pool. The dedicated thread handles the entire lifecycle of the batch request from this point on. A batch response is then returned 324.

Figure 4:
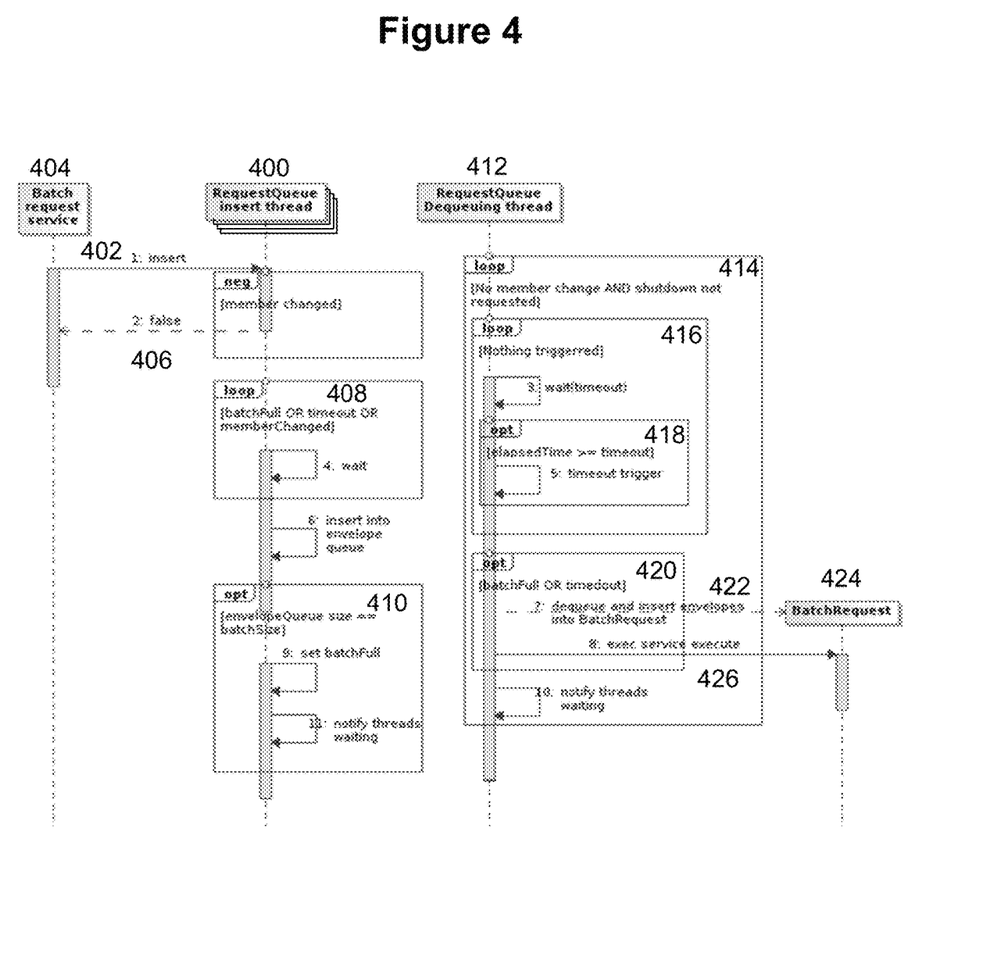
FIG. 4 shows a sequence diagram of small batch request processing, in accordance with an embodiment of the invention.
Figure 5:
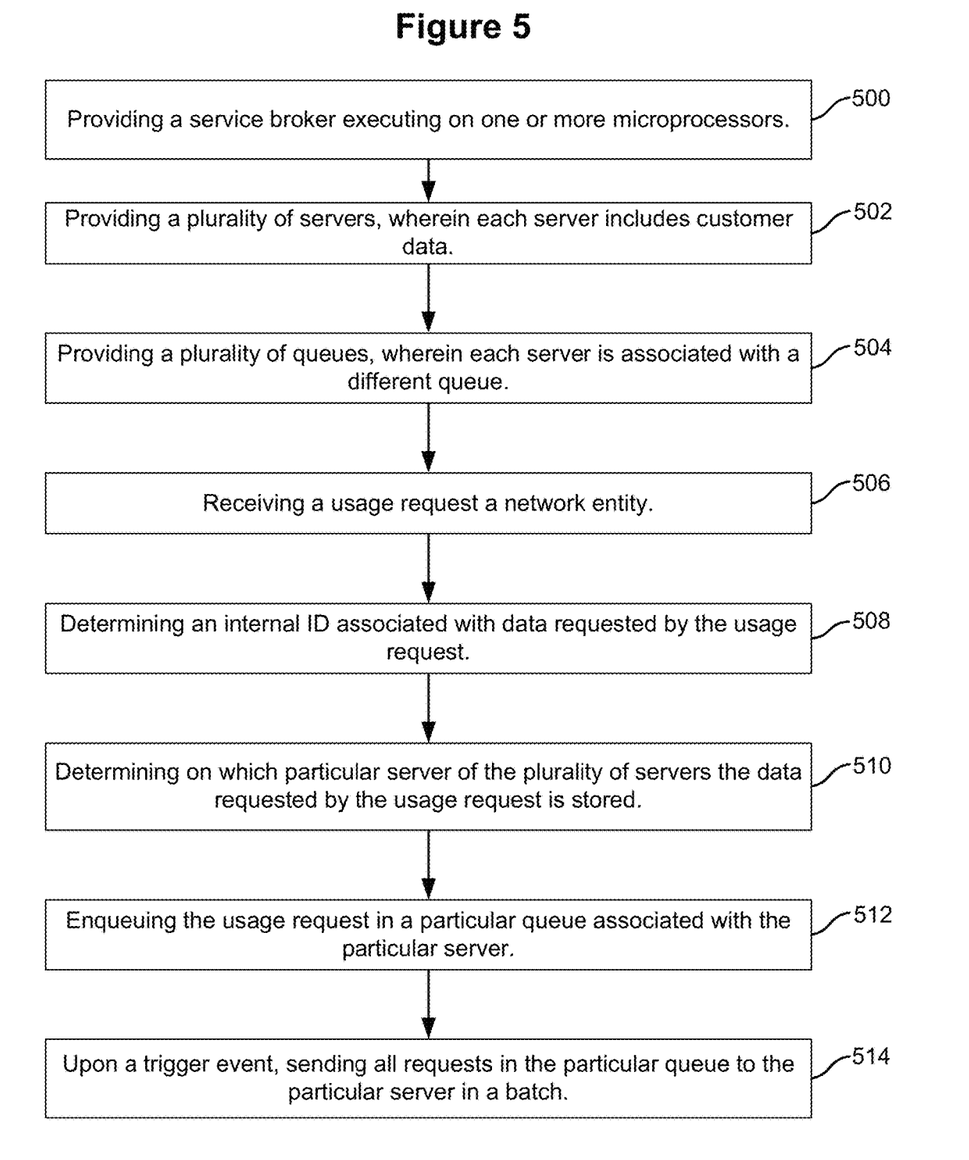
FIG. 5 shows a method for small batch processing of usage requests, in accordance with an embodiment of the invention.

FIG. 4 shows a sequence diagram of small batch request processing, in accordance with an embodiment of the invention. FIG. 4 shows batch request service 404, request queue insert thread 400 and request queue dequeuing thread 412. There are typically many Request Queue insert threads but only one Request Queue dequeuing thread per node. A request queue insert thread 400 can be used to add 402 requests from a batch request service 404 to a request queue. When a request is added, the request queue insert thread 400 can determine if the requested node still exists, if not 406 (e.g., because the server has crashed) suspense management can begin.

The request queue insert thread 400 includes a loop 408 which waits for a trigger to occur. The Request Queue insert thread and Request Queue Dequeue thread can use the monitor pattern to ensure mutually exclusive access to the request queue. The Request Queue insert thread will wait only if one of several condition variables (triggers) is true. Examples of triggers can include if the batch is full, if a timeout condition is reached, or if an error occurs. If the batch full trigger occurs, then the request queue insert thread sets a condition to batch full 410 and processing continues to the request queue dequeuing thread 412. The request queue dequeuing thread 412 can include a plurality of nested loops, including a first loop 414 monitoring for any error conditions and a second loop 416 waiting for a timeout condition. If an elapsed time is greater than or equal to a timeout time, then the timeout trigger 418 has occurred. Once either the timeout trigger or the batch full trigger have occurred 420, then the requests in the queue are dequeued 422 and a batch request 424 is created. The batch request 424 is then sent 426 to a dedicated batch request thread which sends the batch to the server, waits for a response batch, and then returns the response batch to the service broker.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for small batch processing of usage requests from subscribers in a telecommunications network in compliance with a latency requirement, the system comprising:
   an online charging system comprising a plurality of servers, wherein each of said plurality of servers provides an online charging service, and wherein each of said plurality of servers holds customer data for some of the subscribers of the telecommunications network;
   a service broker executing on one or more microprocessors, wherein the service broker comprises a plurality of queues, wherein each queue of said plurality of queues is associated with a different server of said plurality of servers of the online charging system;

wherein the service broker is configured to receive a plurality of usage requests, wherein each of the plurality of usage requests comprises a request for a usage response containing data requested from said customer data, wherein when each usage request from a particular subscriber is received from a network entity, the service broker is configured to     determine an internal ID associated with said data requested by the usage request and associated with said particular subscriber,     determine, using the internal ID, on which particular server of the plurality of servers the data requested by the usage request is stored, and     enqueue the usage request in a particular queue associated with the particular server; and a dequeuinq thread associated with each of the plurality of queues, wherein, upon a trigger event for a particular queue, the dequeuinq thread associated with the particular queue triggers a batch request thread to send to the particular server, a small batch container containing all usage requests in the particular queue for processing by the online charging service provided by the particular server;

wherein, when the small batch container is received at the particular server, the particular server is configured to     process each usage request received in the small batch container sequentially by forwarding each individual usage request to an entry processor for processing by the online charging service, and     when each individual usage request has been processed by the online charging service, return a batch of usage responses to the batch request thread which returns the batch of usage responses to the service broker, wherein the batch of usage responses includes response data for each usage request received in the small batch container; and whereby the system enables small batch processing of said usage requests from said subscribers while satisfying said latency requirement.

2. The system of claim 1, wherein the usage request corresponds to a service of the telecommunications network including one or more of a call from one subscriber to another and a download request from a subscriber.

3. The system of claim 1, wherein the service broker translates the usage request from a network-centric protocol used by the network entity to an internal protocol used by the online charging system.

4. The system of claim 1, wherein:

upon receipt of the batch of usage responses, the service broker transmits usage responses from the batch of usage responses to network entities which originated the usage requests associated with the usage responses.

5. The system of claim 4, further comprising:

wherein when the service broker receives the batch of usage responses from the particular server, the service broker is configured to     translate each usage response in the batch of usage responses from the internal protocol used by the online charging system to the network-centric protocol used by the network entities, to create translated usage responses, and     return the translated usage responses to the network entities which originated the usage requests associated with the translated usage responses.

6. The system of claim 1, wherein the trigger event is accumulation of a selected number of usage requests in the particular queue, or expiration of a timer, whichever occurs first.

7. The system of claim 1 wherein the latency requirement specifies that more than 99% of usage requests be processed in less than 50 milliseconds.

8. A method for small batch processing of usage requests in compliance with a latency requirement in an online charging system comprising a plurality of servers wherein each of said plurality of servers holds customer data for some of the subscribers of a telecommunications network, the method comprising:

providing a service broker;

providing a plurality of queues, wherein each queue is associated with a different server of the plurality of servers;

receiving a plurality of usage requests, wherein each of the plurality of usage requests comprises a request for a usage response containing data derived from said customer data for said subscribers of the telecommunications network;

for each usage request of a plurality of usage requests, receiving the usage request from a network entity at the service broker,     determining an internal ID associated with data requested by the usage request and associated with a particular subscriber,     determining, using the internal ID, on which particular server of the plurality of servers the data requested by the usage request is stored, and     enqueuing the usage request in a queue associated with the particular server;

providing a dequeuinq thread associated with each particular queue of the plurality of queues, wherein upon a trigger event for the particular queue, the dequeuinq thread associated with the particular queue triggers a batch request thread to send all usage requests in the particular queue from the service broker to the particular server associated with the particular queue in a batch of usage requests for processing by the particular server of the online charging system, and receiving with the batch request thread for transmission to the service broker, a batch of usage responses from the particular server of the online charging system after processing by the particular server of each usage request in the batch of usage requests, wherein the batch of usage responses includes response data for each usage request in the batch of usage requests; and thereby enabling small batch processing of said usage requests from said subscribers while satisfying said latency requirement.

9. The method of claim 8, wherein each usage request corresponds to a service of the telecommunications network including one or more of a call from one subscriber to another and a download request from a subscriber.

10. The method of claim 8, wherein the service broker translates each usage request from a network-centric protocol used network entities to an internal protocol used by the online charging system.

11. The method of claim 8, further comprising:

transmitting usage responses from the batch of usage responses from the service broker to network entities which originated the usage requests associated with the usage responses.

12. The method of claim 11, further comprising:
translating the each usage response of the batch of usage responses from an internal protocol used by the online charging system to a network-centric protocol used by the network entities.

13. The method of claim 8, wherein the trigger event is accumulation of a selected number or usage requests in the particular queue, or expiration of a timer, whichever occurs first.

14. The method of claim 8 wherein the latency requirement specifies that more than 99% of usage requests be processed in less than 50 milliseconds.

15. A non-transitory computer readable storage medium including instructions stored thereon for small batch processing of usage requests in compliance with a latency requirement in an online charging system comprising a plurality of servers wherein each of said plurality of servers holds customer data for subscribers of a telecommunications network, which instructions, when executed by a computer, cause the computer to perform steps comprising:
providing a service broker;
providing a plurality of queues, wherein each queue is associated with a different server of the plurality of servers;
receiving a plurality of usage requests, wherein each of the plurality of usage requests comprises a request for a usage response containing data derived from said customer data for said subscribers of the telecommunications network;
for each usage request of a plurality of usage requests,
receiving the usage request from a network entity at the service broker,
determining an internal ID associated with data requested by the usage request and associated with a particular subscriber,
determining, using the internal ID, on which particular server of the plurality of servers the data requested by the usage request is stored, and
enqueuing the usage request in a queue associated with the particular server;
providing a dequeuinq thread associated with each particular queue of the plurality of queues, wherein upon a trigger event for the particular queue, the dequeuinq thread associated with the particular queue triggers a batch request thread to send all usage requests in the particular queue from the service broker to the particular server associated with the particular queue in a batch of usage requests for processing by the particular server of the online charging system, and
receiving, with the batch request thread for transmission to the service broker, a batch of usage responses from the particular server of the online charging system after processing by the particular server of each usage request in the batch of usage requests, wherein the batch of usage responses includes response data for each usage request in the batch of usage requests; and
thereby enabling small batch processing of said usage requests from said subscribers while satisfying said latency requirement.

16. The non-transitory computer readable storage medium of claim 15, wherein each usage request corresponds to a service of the telecommunications network including one or more of a call from one subscriber to another and a download request from a subscriber.

17. The non-transitory computer readable storage medium of claim 15, wherein the service broker translates each usage request from a network-centric protocol used network entities to an internal protocol used by the online charging system.

18. The non-transitory computer readable storage medium of claim 15, wherein the latency requirement specifies that more than 99% of usage requests be processed in less than 50 milliseconds.

19. The non-transitory computer readable storage medium of claim 18, including further instructions stored thereon which instructions, when executed by the computer, cause the computer to perform steps further comprising:
translating in the service broker each usage response of the batch of usage responses from an internal protocol used by the online charging system to a network-centric protocol used by the network entities.

20. The non-transitory computer readable storage medium of claim 15, wherein the trigger event is accumulation of a selected number or usage requests in the particular queue, or expiration of a timer, whichever occurs first.

* * * * *

UNITED STATES PATENT AND TRADEMARK OFFICE
CERTIFICATE OF CORRECTION

PATENT NO. : 9,736,034 B2  
APPLICATION NO. : 13/622546  
DATED : August 15, 2017  
INVENTOR(S) : Kaemmerer et al.

It is certified that error appears in the above-identified patent and that said Letters Patent is hereby corrected as shown below:

In the Claims

In Column 7, Line 17, in Claim 1, delete "dequeuinq" and insert -- dequeuing --, therefor.

In Column 7, Line 19, in Claim 1, delete "dequeuinq" and insert -- dequeuing --, therefor.

In Column 8, Line 36, in Claim 8, delete "dequeuinq" and insert -- dequeuing --, therefor.

In Column 8, Line 38, in Claim 8, delete "dequeuinq" and insert -- dequeuing --, therefor.

In Column 9, Line 41, in Claim 15, delete "dequeuinq" and insert -- dequeuing --, therefor.

In Column 9, Line 43, in Claim 15, delete "dequeuinq" and insert -- dequeuing --, therefor.

Signed and Sealed this  
Nineteenth Day of June, 2018

Andrei Iancu  
*Director of the United States Patent and Trademark Office*